United States Patent

[11] 3,560,781

[72] Inventor Wolfgang Dieter Riecke
Berlin, Germany
[21] Appl. No. 656,400
[22] Filed July 27, 1967
[45] Patented Feb. 2, 1971
[73] Assignee Max-Planck-Gesellschaft Zur Forderung
Der Wissenschaften e.V.
Gottingen, Germany
a corporation of Germany
[32] Priority Feb. 24, 1967
[33] Germany
[31] M72885

[54] CORPUSCULAR BEAM MICROSCOPE APPARATUS
17 Claims, 5 Drawing Figs.
[52] U.S. Cl. .................................................. 313/84, 250/49.5
[51] Int. Cl. ...................................................... H01j 29/46, H01j 37/16
[50] Field of Search........................................ 250/49.5 (4); 313/83, 84

[56] References Cited
FOREIGN PATENTS
923,616  2/1955  Germany................... 250/49.5
929,747  7/1955  Germany................... 250/49.5

OTHER REFERENCES
"Siemens Electron Microscope" published by Siemens & Halske Aktiengesellschaft, Karlsruhe pages 1, 5 and 6.

Primary Examiner—Roy Lake
Assistant Examiner—V. Lafranchi
Attorneys—Curt M. Avery, Arthur E. Wilfond, Herbert L. Lerner and Daniel J. Tick ABSTRACT: The beam condenser located in an electron or ion microscope between the beam source and the objective lens comprises at least two lenses, namely a first condenser lens which produces a reduced image of the beam source, and a last condenser lens which produces a reduced image of an aperture diaphragm upon the object plane defined by the objective lens. Within such an arrangement, the first condenser lens comprises a plurality of lens pole shoe systems that can be selectively placed into active position of axial alignment with the beam source and the objective lens. The pole shoe systems have respectively different imaging lengths but have the diameter of their lens bore as well as the width and axial position of their lens gap, so adapted to one another as to maintain an invariable axial position of the source image produced by the first condenser lens, regardless of which one of the pole shoe systems is placed into active position at a time. This affords selecting different radiation (illumination) apertures for one and the same illuminated area of the object without the necessity of changing the focal lengths of the other lenses; and it permits adjusting the size of the illuminated area of the object independently of the magnitude of the illumination aperture of the object.

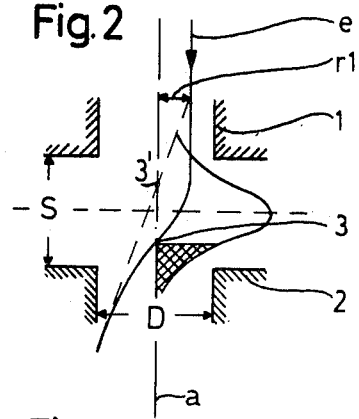
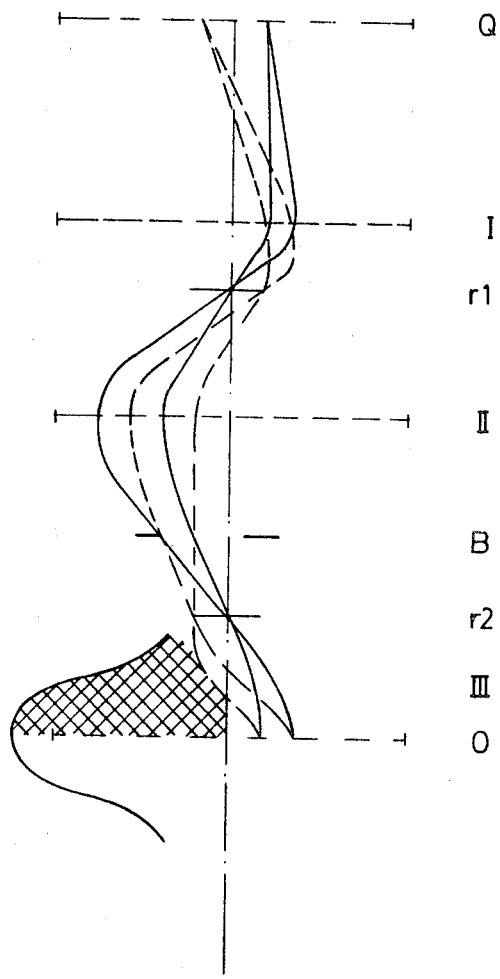

3,560,781

CORPUSCULAR BEAM MICROSCOPE APPARATUS

My invention relates to corpuscular beam apparatus and will hereinafter be described preferably with reference to electron microscopes, although it is likewise applicable to advantage with ion microscopes, electron or ion diffraction equipment, or other corpuscular beam apparatus of the type comprising a beam source, a condenser lens arrangement and an objective lens whose lens field determines an object plane. More particularly the invention relates to corpuscular beam microscope apparatus equipped with at least two condenser lenses, namely a first condenser lens (condenser I) which produces a reduced first image of the beam source, a last condenser lens (condenser III) located between the first condenser and the objective lens, and which also comprises an aperture diaphragm, preferably in such a position that the last condenser produces a reduced image of the diaphragm aperture on the object (specimen) coinciding with the object plane.

Such a series of at least two condenser lenses, an aperture diaphragm determining the size of the object region illuminated, and an objective lens in whose lens field the specimen or object to be investigated is to be located, is known in principle from the paper "Ein Kondensorsystem fur eine starke Objektivlinse" in the publications of the Fifth International Congress for Electron Microscopy, 1962. A similar microscopic apparatus is described in a paper by W. D. Riecke and E. Ruska, "A 100 kV Transmission Electron Microscope With Single-Field Condenser Objective" in the publications of the Sixth International Congress for Electron Microscopy, 1966. In both papers the last condenser III is shown constituted, not by a separate lens, but by the always existing prefield of the objective lens. The utilization of this prefield of the objective lens is also known from German Pat. Nos. 875,555 and 914,167 in conjunction with different lens constructions and different arrangements of the specimen-object. Reference with respect to the same type of combined condenser-objective lens may be had to the copending U.S. Pat. application Ser. No. 656,402, filed Jul. 27, 1967, of W. D. Riecke which is now U.S. Pat. No. 3,508,049 granted Apr. 21, 1970.

The present invention thus relates not only to apparatus with a discrete lens arrangement for the last condenser III but also to apparatus in which the prefield of the objective lens is used as a last condenser III of short focal length, i.e. for producing an image of reduced scale.

Furthermore, a third condenser (condenser II) of long focal length may be situated between the condenser I, that immediately follows the beam source to produce a reduced image thereof, and the last condenser III of short focal length consisting of a separate lens or being constituted by the prefield of the objective lens. The intermediate condenser II transfers the first reduced beam-source image, produced by the condenser I, substantially to the entrance pupil plane of the objective lens. If the condenser III is constituted by a discrete lens assembly, then the front focal plane coincides at least approximately with the entrance pupil plane of the objective lens.

Regardless of which particular system of lenses and beam paths is being employed, it is an object of my invention to provide in any such corpuscular beam apparatus a reliably applicable possibility of irradiating (illuminating) a minute region of the object (specimen) by the corpuscular beam and to also adjust a desired radiation (illumination) aperture of the object.

Another purpose of the invention is to permit changing the illumination aperture for a fixed illuminated region of the object, this fixed region being determined preferably by the choice of the above-mentioned diaphragm aperture projected onto the object.

Still another purpose of the invention is to afford changing the illumination aperture of the object by an adjustment in one of the condenser lenses while requiring no change with respect to the focal lengths of the other lenses.

Still another object of the invention is to permit changing the size of the illuminated region on the specimen or object being investigated independently of the size of the radiation (illumination) aperture of this object, and vice versa.

To achieve these objects, and in accordance with a feature of my invention, a microscopical apparatus of the above-mentioned types has its first condenser (condenser I) provided with several selectively insertable pole shoe systems which have respectively different imaging lengths and in which the width and axial position of the lens gap as well as the diameter of the central pole shoe bore are dimensioned in relation to each other so that the axial position of the first image of the beam source remains invariable when exchanging one of the inserted pole shoe systems for another one of these systems.

It is a notable advantage of such a corpuscular beam apparatus that the focal lengths of the other above-mentioned lenses need not be changed. This is because the exchange of differently dimensioned pole shoe systems causes only a change in imaging ratio of the condenser I but does not involve a change in magnetomotive force (ampere turns) of this condenser nor an axial displacement of its imaging plane. Another favorable property of the apparatus according to the invention resides in the fact that the cross section of the corpuscular beam on the specimen or other object (such as a specimen carrier film), this cross section constituting the "size of the illuminated object area," is adjustable independently of the size of the radiation (illumination) aperture of the object, and vice versa.

This will be presently elucidated with reference to the accompanying drawings in which:

FIG. 1 is an explanatory diagram of the beam path system in a corpuscular beam apparatus, such as an electron microscope, according to the invention;

FIG. 2 is another explanatory diagram relating to the properties of one of the pole shoe systems with which the first condenser lens in apparatus according to the invention is equipped;

Figure 3:
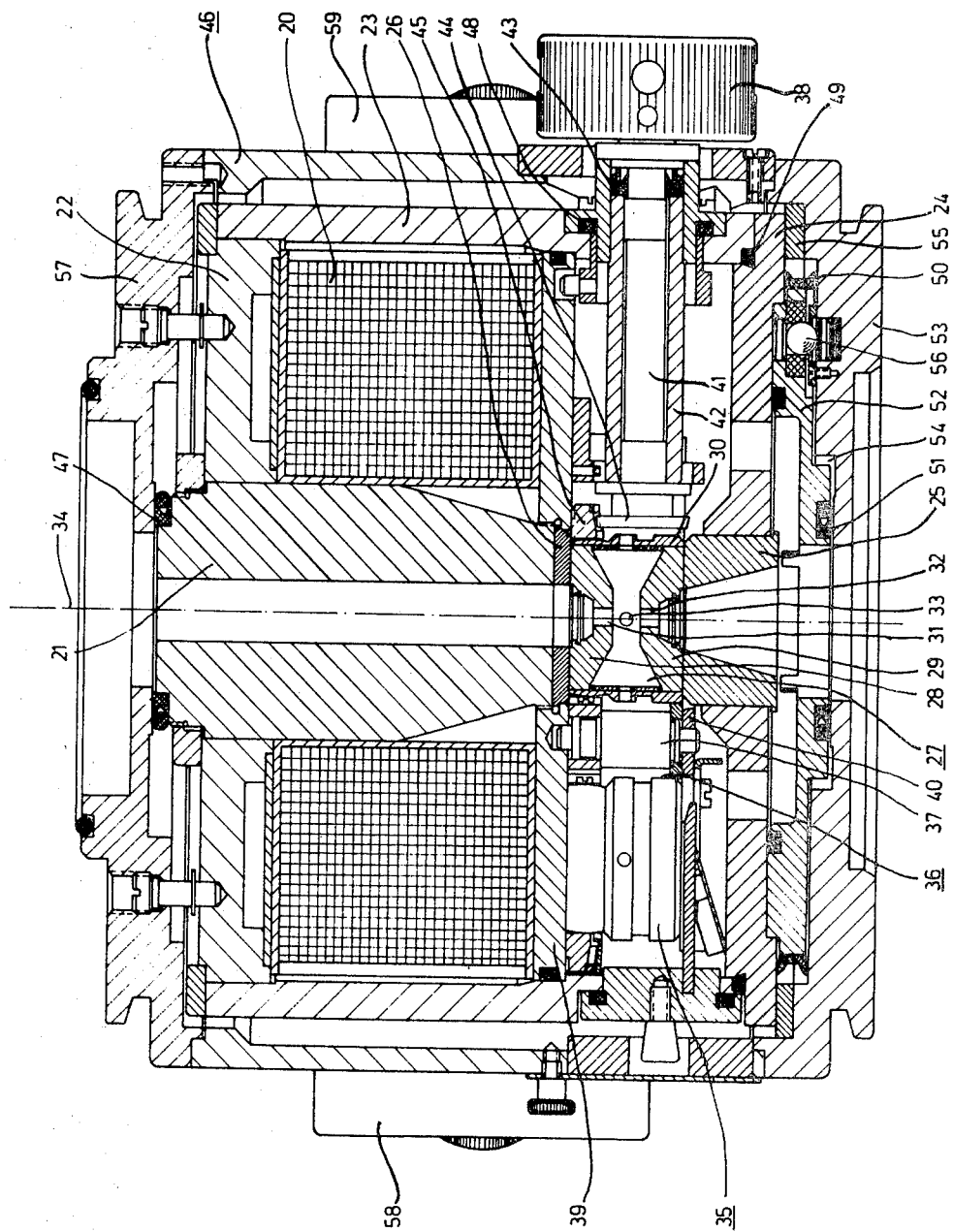
FIG. 3 is a diametrical cross section through a condenser-lens assembly in apparatus according to the invention.

The beam system according to FIG. 1 relates to a corpuscular beam apparatus equipped with two condensers of which only the lens planes are indicated at I and II. The two lenses are constituted by discrete lens assemblies. The apparatus further comprises a last condenser III which is constituted by the prefield of the objective lens whose object plane is indicated at O. FIG. 1 also shows a cross-sectional curve of the magnetic field of the objective lens. The field represented has a bell-shaped configuration, although this is not an indispensable requirement for apparatus according to the invention. The prefield portion is identified by crosshatching. The object plane O is located at approximately the middle of the field configuration, corresponding substantially to the locality of maximum field strength. It will be noted that the object plane is optically or magnetically determined by the objective lens in distinction from the specimen plane or the specimen-bearing plane of the specimen carrier where the specimen or object being investigated may be located in fact. For investigation of a specimen, its cross-sectional plane to be microscopically viewed has to be located in the object plane.

The condenser I having short focal length produces a reduced image $rl$ of the beam source Q. More precisely, such a condenser usually forms a reduced image of the smallest beam cross section (crossover) in front of the emitting cathode surface of the source.

The intermediate condenser II has a longer focal length than the condenser I or the condenser III and produces at $r2$ a sharp image of the reduced first image $rl$ of the beam source Q. Located behind the condenser II, seen in the beam issuing direction, is a limiting aperture diaphragm B. The locality of this diaphragm is within the focal length of the image-forming side of the condenser II The prefield condenser III produces a sharp image of the diaphragm aperture in the object plane O.

Due to the great image reduction effected by the condenser III, very small illuminated object regions can be obtained with the aid of diaphragms B whose aperture diameter from the manufacturing viewpoint, is conveniently large. For example, a diameter of the illuminated object region of 700 A can be readily obtained by employing a diaphragm with an aperture diameter of 10 $\mu$M., the prefield condenser III effecting a reduction of approximately 1:140.

It is of interest that the illumination aperture of the object $\Phi$ is given by the size of the second image $r2$ of the beam source but is independent of the aperture size of the diaphragm B. The diaphragm determines only the size of the object area being illuminated, and this area is independent of the size of the image at $r2$, it being understood that these mutual independencies apply precisely for negligible lens faults. Since the magnitude of $r2$ is given by the product of the magnifying scales of the two condensers I and II (as a rule the condenser II magnifies slightly), the size of the illumination aperture of the object can be varied by changing the magnification ratio of the condenser I.

In principle, of course, a corresponding change in magnification, using an electromagnetic lens as condenser I, can also be effected by changing the magnetomotive force of the condenser I. However, as is known for example from the paper of Liebmann and Grad "Imaging Properties of a Series of Magnetic Electron Lenses," Proc. Phys. Soc. B 64, 1951), pages 956 to 971, particularly page 963, such change in magnetomotive force changes a parameter $k^2$ which is proportional to the square of the maximal magnetic field strength in the lens. As a consequence, the position of the reduced first image $rl$ of the source, produced by the condenser I, will change. Since this position is decisive for the adjustment of ampere-turns of the condenser II, the latter condenser must also be given a new adjustment. In apparatus according to the invention such double adjustment is avoided by leaving the constant magnetomotive force of the condenser I unchanged when varying the illumination aperture of the object by exchanging the pole shoe system located in the operative position for a pole shoe system of different imaging length, the various pole shoe systems being matched to prevent shifting the axial position of the first image $rl$ of the beam source.

It is to be taken into account, however, that to some slight extent a displacement of the plane of the first image $rl$ may occur depending upon whether the pole shoe system has its main planes virtually coincident with the lens center, i.e. whether a so-called "thin" lens is involved, or whether the pole shoe system inserted into active position of the condenser I constitutes a "thick" lens so that the axial extent of the lens field can no longer be neglected relative to the distance from the next following condenser lens II. Some other properties in this respect are encountered with pole shoe systems whose bore diameters and gap widths coincide as to order of magnitude with the corresponding data of the objective lens. For explaining these properties, also investigated in the above-mentioned paper of Liebmann and Grad, reference will be made to FIG. 2.

The two pole shoes 1 and 2 of the condenser I shown in FIG. 2 produce a lens field of an approximately bell-shaped cross section, for example. The condenser II, not shown in this illustration, "sees" the virtual image $rl$ of the beam source. The actual intersection 3 of the corpuscular beam, for example an electron beam $e$, with the lens axis $a$ is shifted backwards to the point 3' due to the effect of the tail-field of the condenser I, this tail-field being identified by crosshatching. This effect occurs only with a condenser lens whose pole shoe system has such a dimensioning that there occurs tail-field which causes curving of the beam $e$.

In such a condenser I, whose lens field has an appreciable axial extent in comparison with the distance from the next condenser lens, as well as with a condenser I whose main planes virtually coincide with the lens center ("thin" lens with $k^2$ in the order of 0.1), the differences in the axial position of the virtual first pictures of the beam source produced with respectively different pole shoe systems, are preferably compensated by corresponding differences in the axial position of the lens gap in the different pole shoe systems. That is, the gaps of the different pole shoe systems, mounted on a holder structure that extends transverse to the corpuscular beam, are arranged at respectively different heights for the different systems, assuming that the beam axis is vertical and the plane of the pole shoe holder is horizontal.

If all of the pole shoe systems of the first condenser lens have a diameter D (FIG. 2) of their pole shoe bore and have a lens gap width S in the order of magnitude of the corresponding diameter and width values of the objective lens, such a mutual displacement or staggering of the different pole shoe systems in the axial direction can be dispensed with by selecting the excitation of the condenser I in such a manner that this condenser has at least approximately the minimal focal length. This will be understood from the following. As can be seen from the curves known from the paper by Liebmann and Grad (Page 963), small changes of the parameter $k^2$ do not result in appreciable displacements of the here interesting back focal point (on the image-forming side) of an electromagnetic lens, this focal point being located approximately in the lens center when the lens is operated in the region of its minimal focal length, i.e. where the curve of the focal length exhibits an extreme value.

For a given beam voltage, the lens current required for obtaining the minimum focal length varies only little for different ratios of gap width S to bore diameter D. If one wants to exactly maintain an operation of the condenser I at minimal focal length with any one of its pole shoe systems, without necessity for changing the lens current, then care should be taken that all of the pole shoe systems possess the same ratio of gap width S to bore diameter D.

To avoid or minimize lens faults, it has been found advisable to give the gap width and the bore diameter of the pole shoe system in condenser II the same dimensions, at least as to the order of magnitude, and these dimensions should be preferably in the same order of magnitude as the focal length. In practice, a value of 80 mm. has been found suitable.

The area limit diaphragm is preferably arranged at a relatively large distance from the entrance pupil plane of the objective lens. That is, when using a separate condenser lens III, the diaphragm should be situated far ahead of the front focal plane. As a rule, this distance amounts to more than 100 times the focal length of the condenser III. A distance in the order of magnitude of 200 mm. has been found suitable.

For accommodating the plurality of different pole shoe systems, the assembly of condenser I is preferably equipped with a holder structure which carries the pole shoe systems and is displaceable in a plane transverse to the axis of the lens system. Preferably the holder structure is designed as a turntable rotatable about an axis spaced from and parallel to the axis of the corpuscular beam. Rotation of the table then serves to place the individual pole shoe systems into or out of the operative position. In principle such holders and turntables are known as such for projective lenses.

Since the condenser I, particularly in a corpuscular beam apparatus according to the principle shown in FIG. 1, may be located at relatively great height, it is advisable to effect the exchange of the pole shoe systems with the aid of actuating motors which can be controlled by the attending person, for example when sitting in front of the microscope apparatus. If desired, however, a mechanical transmission with the aid of control rods or other links leading from an actuator or handle in the vicinity of the attending person to the condenser I may also be provided, or the driving members may be arranged directly in the vicinity of the condenser I.

The holder structure or turntable may be equipped with electric contacts which effect an indication of the fact that a pole shoe system has been placed in accurate operating position, or which cause the actuating motors to stop upon termination of the pole shoe exchange.

Preferably the entire assembly of condenser I, including the holder or turntable for the pole shoe systems, is adjustably mounted so as to be displaceable in directions transverse to the axis of the corpuscular beam.

Figure 4:
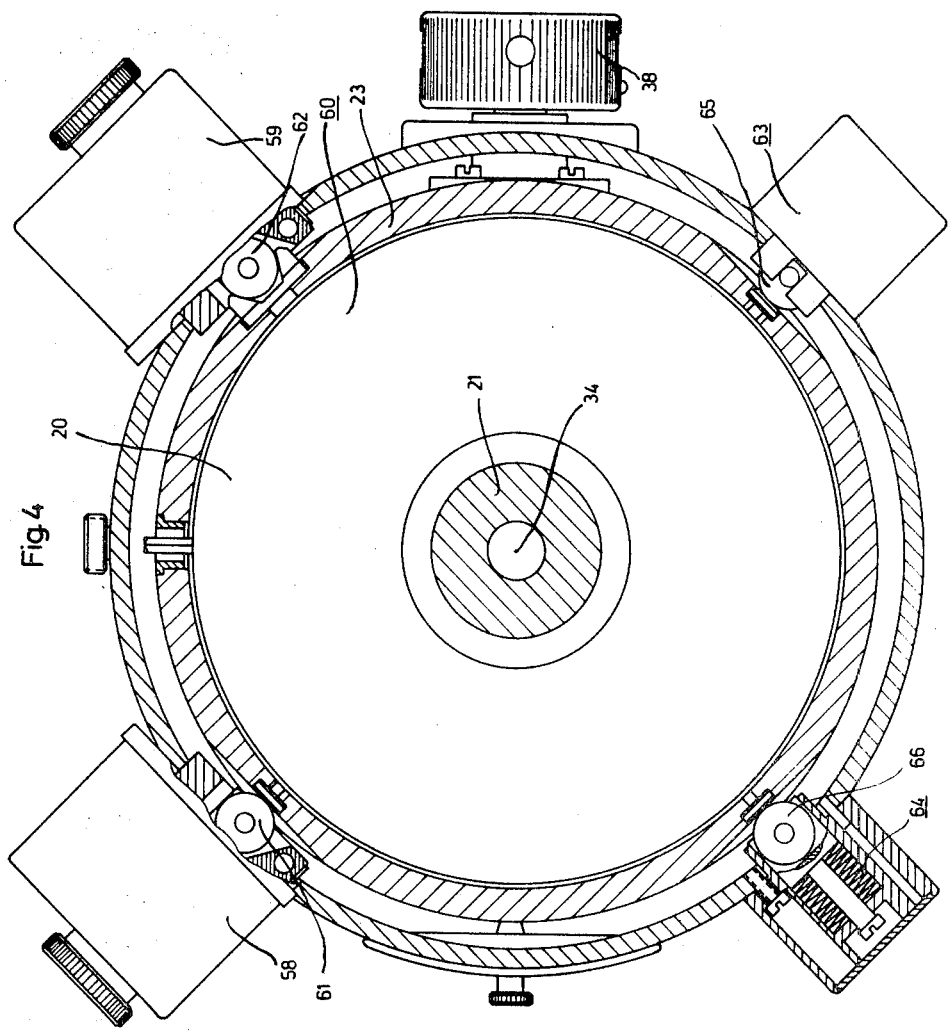
FIG. 4 is a partly sectional plan view of the same assembly.
Figure 5:
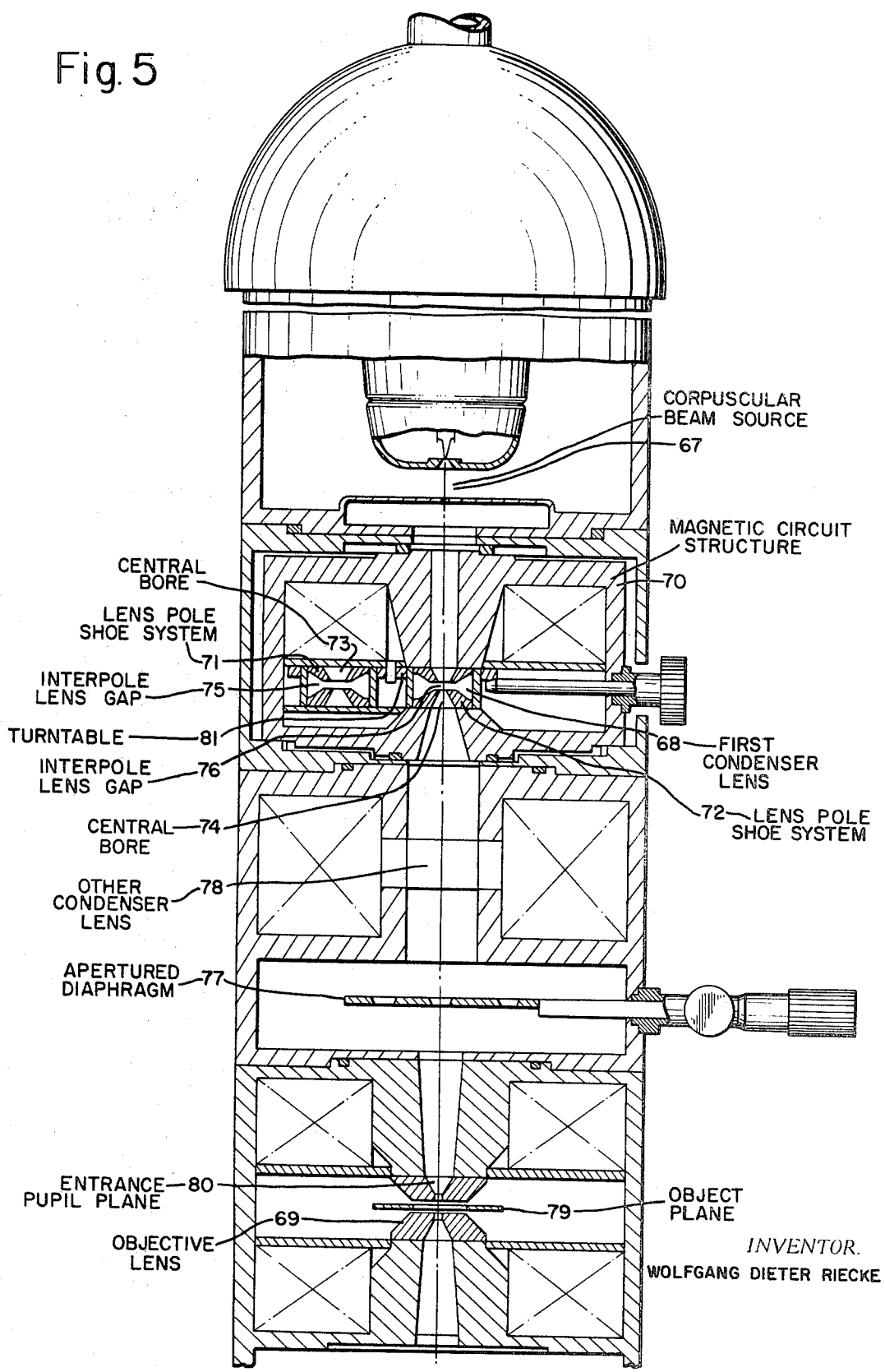
FIG. 5 is an elevational view partly in section of the corpuscular beam apparatus according to the invention.

The features just described are embodied in the condenser assembly according to the invention illustrated in FIGS. 3 and 4. This assembly is applicable in electron microscopes, for example in a microscope as completely illustrated in the abovementioned publication of the Sixth International Congress for Electron Microscopy, 1966.

The condenser I comprises an excitation winding 20 surrounded by a magnetic iron circuit for conducting the magnetic flux of the lens, this circuit being composed of parts 21 to 26. The flux passes through the inserted pole shoe system 27, containing two pole shoes 28 and 29. The two pole shoes are joined together by a nonmagnetic sleeve 30, for example of brass, so as to form a rigid structural unit. The pole shoes have coaxially aligned central bores 31 and 32 respectively and form between each other a lens gap 33 in which the magnetic field of the condenser lens I acts upon the electron beam whose axis is denoted by 34.

The lens is equipped with four pole shoe systems of which in FIG. 3 only the systems denoted by 27 and 35 are visible. The pole shoe systems are inserted into a turntable generally denoted by 36. The table is rotatable about an axle member 37 by means of a driving gear 38 so that selectively one of the pole shoe systems is turned into the beam path. The axle member 37 is journaled at the top in a plate 39 of magnetically ineffective material such as brass. The bottom end of the axle member 37 is journaled in another plate 40 likewise of magnetically ineffective material.

The rotary motion of the driving wheel 38 is transmitted to the turntable 36 through a drive shaft 41, passing through a sleeve 42 and vacuum-tightly sealed by means of a sealing gasket 43. The shaft carries a spur gear meshing with an annular gear or rack 45 fastened to the turntable. Spring catches are preferably provided for marking or securing the proper operating positions of the individual pole shoe systems, these catches not being visible in the illustrations.

The entire lens assembly, inclusive of the turntable 36 with the pole shoe systems and the appertaining drive means, is mounted in the column 46 that forms part of the evacuated housing of the electron microscope and is displaceable transversely to the beam axis 34. As will be seen from the arrangement of seals 47, 48, 43, 49, 50, and 51, the top portion of the lens assembly is largely located outside of the vacuum space of the electron microscope, whereas a ring-shaped chamber 54 is located beneath the bottom of the lens assembly, namely between a disc-shaped member 52 and a fixed support 53 carrying the entire lens assembly. More specifically, the lens assembly rests with its bottom member 24 upon a ring 55 of hardened steel or the like which is placed upon an annular shoulder formed by the fixed member 53 of the column or housing structure of the microscope.

The chamber 54 can be selectively connected, for example with the aid of a three-way valve or cock, with the ambient air or with a vessel of low pressure, such as with the prevacuum tank of the electron microscope. When the pressure in chamber 54 is increased by having it communicate with the ambient air, the contact pressure between the lens assembly and the ring plate 55 is reduced to facilitate a transverse displacement of the lens assembly. When thereafter the pressure in chamber 54 is decreased by connecting it with the vacuum space, the contacting pressure between the lens assembly and the ring plate 55 is increased in order to rigidly fix the lens assembly to the supporting structure. The duct and valve connections for thus controlling the pressure in chamber 54 are not illustrated. If desired, reference as to these details may be had to the copending application Ser. No. 656,557, filed July 27, 1967, of which I am a coinventor.

For reducing the contacting force between the lens assembly and its fixed support, there is provided a sprung ball arrangement 56. Preferably three such ball and spring arrangements are mounted in a rotationally symmetrical grouping with respect to the beam axis 34. The effects of the springs and of the controllable pressure in the chamber become superimposed upon each other in such a manner that the spring arrangements 56 furnish a constant share of the contacting pressure acting upon the ring 55, whereas the controllable pressure in chamber 54 supplies a variable share of this contacting pressure. Relative to this coaction of the chamber 54 with the spring devices, reference may also be had to the copending application just mentioned.

The beam source of the microscope is mounted on top of the portion 57 located above the lens assembly proper and corresponding to the above-mentioned member 53.

The means for effecting the transverse displacement of the pole piece systems are best apparent from FIG. 4. The illustrated section is taken at the height of the actuating motors 58 and 59 which effect the transverse displacement of the condenser lens assembly denoted by 60 in FIG. 4. The motors act through rollers 61 and 62 upon the iron member of the magnetic circuit in opposition to the force of restoring springs 63 and 64. These springs are constituted by respective stacks of disc springs. Each stack is provided with a roller 65 or 66, thus permitting any displacements of the lens assembly 60 in a plane transverse to the axis 34 of the electron beam.

The driving wheel or gear 38 for the turntable 36 may be replaced by an actuating motor. Furthermore, the actuating wheel proper or a control knob may be arranged in the servicing desk for the electron microscope to act upon the turntable through a mechanical or electrical transmission which transfers the rotation of the wheel or knob to the turntable 36.

As explained, the four pole shoe systems, of which only those denoted by 27 and 35 are visible in FIG. 3, have different imaging lengths respectively but have the axial position of the lens gaps, the diameter of the pole shoe bores and the width of the lens gaps so dimensioned that the axial position of the first image of the beam source remains invariable when exchanging one inserted pole shoe system for any one of the other three available systems.

The independent adjustment of illumination aperture of the object, on the one hand, and illuminated object area, on the other hand, is also attained with the aid of the invention when employing a beam path of the type indicated in the periodical "Optik" 1962, pages 273—286. Such a beam path is distinguished by the fact that the above-described area limit diaphragm is substituted by the reduced image of the beam source formed by means of the condenser I and, as the case may be, by further condenser lenses, and that a diaphragm that determines the illumination (radiation) aperture of the object is arranged in the entrance pupil plane of the objective lens. In this case, the change of pole shoe systems in condenser I according to the invention has the result of changing the size of the illuminated region of the object.

To those skilled in the art it will be apparent from a study of this disclosure that my invention is amenable to a variety of modifications and may be given embodiments than particularly illustrated and described herein, without departing from the essential features of my invention and within the scope of the claims annexed hereto.

I claim:

1. Corpuscular beam apparatus, comprising in axial alignment a corpuscular beam source, condenser lens means with a first condenser lens facing the source for producing a reduced image thereof, and an objective lens defining an object plane, said first condenser lens comprising a fixed magnetic circuit structure and a plurality of lens pole shoe systems selectively placeable into active position relative to said fixed structure so as to be axially aligned with said source and said objective lens, each of said pole shoe systems having a central bore for the passage of the electron beam and an interpole lens gap, and said pole shoe systems having respectively different image distances and having the diameter of said bore and the width and axial position of said lens gap adapted to maintain the axial position of said source image substantially invariable regardless of which of said pole shoe systems is placed into said active position.

2. Corpuscular beam apparatus according to claim 1, comprising a corpuscular beam source, a first condenser lens producing a reduced image of said source, an apertured diaphragm coaxially following said first condenser lens in the beam direction, further condenser lens means comprising a last condenser lens to produce a reduced image of the diaphragm aperture on an object plane, an objective lens defining said object plane, said first condenser lens having a plurality of lens pole shoe systems selectively placeable into active position of coaxial alignment with said last condenser lens and objective lens, said pole shoe systems having respectively different image distances and having each a central pole shoe bore and an interpole lens gap, and said pole shoe systems having the diameter of said bore and the width and axial position of said lens gap adapted to each other so as to maintain the axial position of said source image substantially invariable regardless of which one of said pole shoe systems is placed into said active position.

3. In apparatus according to claim 2, said first condenser having its main electron-optical planes substantially coincide with the lens center; and said pole shoe systems of said first condenser lens differing from each other substantially in the axial position of said respective lens gaps to thereby compensate for differences in the axial position of said source image.

4. In apparatus according to claim 2, said first condenser having an axially extended lens field as compared with its distance from said further condenser lens means; and said pole shoe systems of said first condenser lens differing from each other substantially in the axial positions of said respective lens gaps to thereby compensate for differences in the axial position of said source image.

5. In apparatus according to claim 2, said bore diameter and lends gap width in at least two of said pole shoe systems being in the same order of magnitude as the bore diameter and gap width respectively of said objective lens, and said first condenser having when in operation an excitation for at least approximately the minimal focal length.

6. In apparatus according to claim 1, all of said pole shoe systems of said first condenser lens having the same ratio of lens gap width to bore diameter.

7. In apparatus according to claim 2, said last condenser lens forming a lens assembly distinct from that of said objective lens and having a focal plane substantially coincident with the entrance pupil plane of said objective lens.

8. In apparatus according to claim 2, said objective lens having prefield which forms said last condenser lens.

9. In apparatus according to claim 2, said further condenser lens means comprising another condenser lens located between said first and said last condenser lenses and of longer focal length than said latter condenser lenses so as to transfer said source image at least approximately to the entrance pupil plane of said objective lens.

10. In apparatus according to claim 9, said other condenser lens having a lens gap width and a lens bore diameter whose respective sizes are of the same order of magnitude.

11. In apparatus according to claim 10, said other condenser lens having a lens gap width and a lens bore diameter of the same order of magnitude as its focal length.

12. In apparatus according to claim 2, said diaphragm being spaced from the entrance pupil plane of said objective lens a distance in the order of magnitude of 100 times the focal length of said last condenser lens.

13. Apparatus according to claim 1, comprising a holder structure displaceable relative to said lenses in a plane perpendicular to the lens axis, said pole shoe systems being mounted on said holder structure for selectively placing said systems to the active position by displacing said holder structure.

14. In apparatus according to claim 13, said holder structure comprising a turntable having an axis of rotation spaced from said lens axis and parallel thereto, whereby rotational displacement of said turntable places said pole shoe systems into and out of said active position.

15. Apparatus according to claim 14, comprising an electric drive coupled with said turntable for rotating the latter.

16. In apparatus according to claim 13, said first condenser lens comprising a magnetic circuit assembly, said holder structure being displaceably mounted on said assembly to form a structural unit together therewith, and said unit being displaceable as a whole for adjustment transversely of the beam axis.

17. Apparatus according to claim 1, comprising a radiation aperture diaphragm in the entrance pupil plane of said objective lens for determining the irradiation aperture of the object being imaged.